(12) United States Patent
Marshall

(10) Patent No.: US 6,322,367 B1
(45) Date of Patent: Nov. 27, 2001

(54) METHOD AND MATERIALS FOR TEACHING THE PHONETIC CODE AND REPAIRING SELF ESTEEM

(76) Inventor: Tawanna Alyce Marshall, P.O. Box 1589, Temple Hills, MD (US) 20757

( * ) Notice: Subject to any disclaimer, the term of this patent is extended or adjusted under 35 U.S.C. 154(b) by 0 days.

(21) Appl. No.: 09/401,334

(22) Filed: Sep. 23, 1999

(51) Int. Cl.[7] .................................................. G09B 17/00
(52) U.S. Cl. ......................................... 434/178; 434/167
(58) Field of Search .................................... 434/159, 167, 434/168, 169, 170, 171, 172, 173, 174, 175, 176, 178

(56) References Cited

U.S. PATENT DOCUMENTS

| | | | |
|---|---|---|---|
| 3,805,416 | * | 4/1974 | Plefkey ................................. 434/167 |
| 4,204,343 | * | 5/1980 | Brooks ................................. 434/167 |
| 4,323,349 | * | 4/1982 | Maltzmann ........................... 434/184 |
| 4,345,902 | * | 8/1982 | Hengel ................................. 434/170 |
| 4,579,533 | * | 4/1986 | Anderson ............................. 434/157 |
| 4,655,713 | * | 4/1987 | Weiss ................................... 434/178 |
| 4,661,074 | * | 4/1987 | Walker ................................. 434/178 |
| 4,713,008 | * | 12/1987 | Stocker ................................ 434/167 |
| 5,057,020 | * | 10/1991 | Cytanovich .......................... 434/178 |
| 5,328,373 | * | 7/1994 | Wood ................................... 434/172 |
| 5,387,104 | * | 2/1995 | Corder ................................. 434/156 |
| 5,421,731 | * | 6/1995 | Walker ................................. 434/167 |
| 5,429,513 | * | 7/1995 | Diaz-Plaza .......................... 434/167 |
| 5,451,163 | * | 9/1995 | Black ................................... 434/178 |
| 5,511,980 | * | 4/1996 | Wood ................................... 434/169 |
| 5,692,906 | * | 12/1997 | Corder ................................. 434/156 |
| 5,788,502 | * | 8/1998 | Shea ..................................... 434/157 |
| 5,788,503 | * | 8/1998 | Shapiro ................................ 434/172 |
| 5,799,267 | * | 8/1998 | Sigel ....................................... 704/1 |
| 5,906,492 | * | 5/1999 | Putterman ............................ 434/169 |

* cited by examiner

Primary Examiner—Jacob K. Ackun, Jr.
Assistant Examiner—Kurt Fernstrom

(57) ABSTRACT

This invention of materials and method is designed for assessment of phonetic reading ability and for teaching the phonetic reading code to children and adults of average intelligence and abilities who have responded poorly to traditional reading instructional methods or who choose not to be limited by methods of reading dependent on memorization of words. It can simultaneously repair a sufficient amount of the psychological damage that occurred because of the person's inability to read so that the person can succeed at learning the reading code. The features named allow it to be used as an assessment and skill building tool for psychotherapists and other health and education professionals which can greatly reduce or prevent emotional and psychological problems through the therapeutic elevation of self esteem and diminishing of negative emotions including fear, embarrassment and anger associated with reading problems. Parts of this invention, the written materials, can be used by parents for instruction of their children in development of phonetic reading skills.

6 Claims, 7 Drawing Sheets

---

The Reading Key
*FAST PHONICS*
© 1998 Tawanna Marshall

Reading is as much about your ears as it is your eyes. There are a few things you will need to remember but most of reading is looking at the letter and then making the sound of that letter out loud. When you string the sounds of the letters together, slowly at first then a little faster, you will end up automatically saying words. That is all that reading is, saying words, one after the other because you are saying out loud the sound of the letters that you see written on the paper. You can learn to read if you can hear the different sounds that the letters make when you or someone else speaks.

FIG. 1A

The Reading Key
*FAST PHONICS*
© 1998 Tawanna Marshall

Reading is as much about your ears as it is your eyes. There are a few things you will need to remember but most of reading is looking at the letter and then making the sound of that letter out loud. When you string the sounds of the letters together, slowly at first then a little faster, you will end up automatically saying words. That is all that reading is, saying words, one after the other because you are saying out loud the sound of the letters that you see written on the paper. You can learn to read if you can hear the different sounds that the letters make when you or someone else speaks.

FIG. 1B

Remember, Reading is mostly:
1. Learning the sounds assigned to each letter (consonant or vowel)

2. Saying those sounds out loud, one after the other, slowly at first, then faster

FIG. 1C

3. Placing emphasis on the correct syllable
    as shown by the dictionary mark ʹ

FIG. 1D

When you do this, you will say a word automatically.
You will be reading.

FIG. 1E

A few exceptions to the rules you will have to memorize because
English is a *crazy language!*

© 1998 Tawanna Marshall

FIG. 2A

WORKSHEET

(You may want to use the paragraph below for extracting word samples)

"The simple act of blowing a blast upon the trumpet by the army of Joshua around Jericho, and by Gideon's little band about the hosts of Median, was made effectual, through the power of God, to overthrow the might of His enemies. The most complete system that men have ever devised, apart from the power and wisdom of God, will prove a failure, while the most unpromising methods will succeed when divinely appointed and entered upon with humility and faith. Trust in God and obedience to His will are as crucial to the Christian in the spiritual warfare as to Gideon and Joshua in their battle with the Canaanites. By the repeated manifestations of His power in behalf of Israel, God would lead them to have faith in Him--with confidence to seek His help in every emergency. He is just as willing to work with the efforts of His people now and to accomplish great things through weak instrumentalities. All heaven awaits our demand upon its wisdom and strength. God is 'able to do exceeding abundantly above all that we ask or think.' Ephesians 3:20."
Patriarchs and Prophets, White, E.G., Pacific Press Publishing Association, 1958, p. 554.

DO NOT MISS YOUR SECOND AND FINAL APPOINTMENT - OTHERWISE THE FIRST HALF MAY BECOME USELESS TO YOU!

Return Day _____ Date _____ Time: _____ Place: _____

FIG. 2B (OLD ENGLISH TYPE BELOW)
𝖚𝖘𝖊 𝖘𝖕𝖆𝖈𝖊 𝖇𝖊𝖑𝖔𝖜 𝖋𝖔𝖗 𝖜𝖗𝖎𝖙𝖎𝖓𝖌 𝖜𝖔𝖗𝖉𝖘
USE SPACE BELOW FOR WRITING WORDS

FIG. 3A

The ALPHABET is made up of 26 letters that are divided into 2 groups. The groups are:
1. Consonants
2. Vowels

FIG. 3B

VOWELS are divided into 2 parts
1. *Long vowels* sound like the letter name
2. *Short vowels* have many sounds

FIG. 3C

```
Consonants  =  20 letters of the alphabet
Vowels      =   5 letters of the alphabet
The Exception  1 letter "Y" is sometimes
                  a Vowel, other times
                  a Consonant
       Total  26 letters in the Alphabet
```

FIG. 3D

Each of the letters has been given at least one sound and some letters have more than one sound. When you hear and remember the sounds of the letters, and say those sounds out loud one after another, you will automatically say words.
*THEN YOU CAN READ ANYTHING.* ©

FIG. 3E

The sounds of the letters can be a little tricky but remember that you are smarter than 26 little letters. You can learn to remember how the letters sound. So let's go!

FIG. 4A

The Alphabet = letters A - Z (Vowels + Consonants)

FIG. 4B

VOWELS = 5 letters

Aa  Ee  I i  Oo  Uu
and sometimes Yy

FIG. 4C

CONSONANTS = 20 + 1 letters (all letters that are not vowels)

| | | |
|---|---|---|
| Bb - baby | Kk - kite | T t - time |
| Cc - (k)can<br>(s)cents | L l - lamp | V v - van |
| | Mm - man | Ww - will |
| Dd - dog | Nn - name | Xx - Xray |
| F f - fun | Pp - puppy | ax, except<br>(z)xylophone |
| Gg - get<br>(j)- gentle | Q q - queen<br>(qu) | Yy - yes |
| Hh - here | R r - rat | Zz - zipper |
| J j - jar | Ss - sun | |

FIG. 5

LETTER BLENDS AND EXCEPTIONS - FILL IN   (Must memorize)

CH   as in 'check', or the sound of "K" as in 'psychology'
SH   as in 'should' or 'shirt'

TR (ch r) as in tree, truck

STR   as in 'street'

ER   as in 'master'
UR   as in 'further'
IR    as in 'fir' tree

PH   as in phone
TION (shun) as in dictionary

BLE   (bul) as in 'able'
TH    as in 'the'

FIG. 6

Long Vowels
letter sounds

Ā    bāby    māke

Ē    mē    ēven   ēat

Ī    īce    tīe    fīle

Ō    ōpen    nō

Ū    ūse    ūniform

& sometimes

Y(ē) city, biology (ī) my, why

FIG. 7

Short Vowels
various sounds

Ă  ăpple, făr, whăt
Ĕ  ĕggs, ĕnd, gĕt
Ĭ  ĭt, wĭth, ĭn, chĭp
Ŏ  ŏn, ŏff, tŏ, pŏŏl
Ŭ  ŭgly, mŭg, ŭtter & sometimes
Y (ĭ) system, pygmy

US 6,322,367 B1

METHOD AND MATERIALS FOR TEACHING THE PHONETIC CODE AND REPAIRING SELF ESTEEM

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

American schools have taught reading by using a variety of methods. Popular methods used in public schools over the last forty five years have taught children to associate words with pictures or other visual clues, thus replacing the age-old phonics (letter sounds) instruction used before that time. These methods known as "Look-Say," and "Sight" methods depend in large part on the person's capacity to memorize words. For students, this means committing more words to memory until the task becomes overwhelming. When the Whole Language approach is used, students learn a bit of phonics, but seem to miss some of the essential parts of it. Without understanding those missed portions of phonics instruction, the child experiences difficulty reading as he or she advances in age and in grade and is required to add more words to an ever increasing vocabulary.

Many children who read poorly are now labeled "dyslexic," a term applied to people who experience specific problems with reading and language. Many "dyslexic" children are placed in special education classes with an understanding on their part that in some way they are "learning disabled," less than normal, defective. When otherwise normal people perceive of themselves as defective or mentally impaired in reading ability, often they experience emotional and psychological pain. They feel ashamed. The perception that they themselves have internal deficits that make learning to read a problem can translate into lowered self esteem. With lowered self esteem, it is common for children, adolescents and adults to experience problems in relationships with peers, authority figures, subordinates, and practically all other people. They may become angry with themselves but direct that anger outward toward others. They may develop a dislike for the school experience and begin acting out their frustration. Low self esteem can be seen in behavior that ranges from clowning, to indifference with an "I don't care" attitude about everything, to irritability sometimes called "a short fuse," paranoia, or to outright rage. Often that acting out causes peers, teachers and administrators to also consider them as abnormal people and not simply children with unmet learning needs. The problem that begins in first grade worsens by fourth or fifth grade and often becomes almost unmanageable during seventh and eighth grades. If they manage to continue into high school, these students may become even more disruptive, be poor achievers academically, and drop out before graduation.

Some students invent survival strategies and manage to graduate and even go to college. Nevertheless, the reading problems plague them throughout their career preparation and may dictate which fields of study they enter. Such students may understandably exclude fields of study that require learning great numbers of new, long and difficult words, as may be found in the sciences or in legal or medical professions. Some become driven as over achievers in other fields. The list of behavioral and emotional responses and consequences is enormous. Despite achievements or lack of achievements, most if not all will invent reading avoidance tactics to camouflage the real problem of poor reading skills and internally continue to feel inadequate. Feelings of inadequacy that produce low self esteem work against development of good mental health for the individual and are likely to be manifested in serious social problems affecting all.

The problem that originated with popular methods of reading becomes further complicated when parents realize that the child has developed emotional and/or behavioral problems and seek help from a psychotherapist or similar professional. The therapist may identify the child's emotional and behavioral problems with appropriate terminology and commence treating those problems. A similar approach may be used with adults who experience relationship problems. Assessment of reading disabilities may or may not "figure into" the intervention for either child or adult. If a referral for educational tutoring is made, it places the client right back in the system where the problem originated, a situation that could make matters worse. The therapist identifies the educational portion of the problem as being outside the range of therapeutic intervention, and the educator identifies the psychological problems as barriers to the person's ability to engage in the learning process and as being outside the range of educational intervention. This leaves the reading problem unresolved and the related emotional and psychological problems under treated and worsening. The symptoms of the problem may receive attention from the therapist but if the cause is not identified and eradicated, the problem of low self esteem will continue to manifest itself in other ways. As these adolescents and adults have children, they find themselves incapable of helping those children develop reading skills; very likely the cycle repeats.

This invention of method and materials gives the therapist and parents the tools for correcting the problem that had previously been relegated to "No man's land." For the people who have been psychologically damaged by reading instructional methods, the two problems must be dealt with as one otherwise the lack of attention to one or the other undermines the progress of restorative efforts. This invention provides motivation and instruction in learning the code needed for development of phonetic reading skills and is not based on word memorization abilities It simultaneously repairs some of the psychological damage done to the student who has suffered lowering of self esteem because of being unable to read well after participating in traditional and alternative reading instructional methods. It offers a practical tool with wide application that can reduce the cost of education and mental health treatment of children and adults, and reduce personal and societal problems resulting from impaired reading skills.

BRIEF SUMMARY

This inventive process uses original, simplified phonics instructional materials and a method that incorporates motivational address, play, confidence building activities, and voluntary, interactive learning activities that teach the reading code through the use of phonics. Students are diagnosed within five minutes and learn in three (3) hours the code needed to read phonetically and pronounce new, long and difficult words. The present invention is a tool that can treat and/or minimize development of a negative self image and related emotional problems through acquisition of the code needed for reading skill. It boosts self esteem and can diminish negative emotions including fear, embarrassment and anger associated with reading problems. This invention of diagnostic and therapeutic method and materials is used to meet the needs of those categorized in "No man's land" because of their dual problems of reading skill deficits and low self esteem caused by the deficits and who have not been treated for both problems simultaneously by either therapist or educator. Use of this invention can reduce if not eliminate the need for extensive professional mental, emotional and psychological intervention because of the student's reading problems. It is well adapted for use by others especially family members.

BRIEF DESCRIPTION OF THE SEVERAL VIEWS OF THE DRAWINGS

FIG. 1A shows the title of the guide sheets and a statement explaining how reading occurs.

FIG. 1B shows a restatement of steps 1 and 2 of how reading occurs.

FIG. 1C shows a statement about and illustration of the stress mark.

FIG. 1D shows two sentences further completing a statement of how reading occurs.

FIG. 1E shows a statement about exceptions to reading rules.

FIG. 2A shows a worksheet with a paragraph of word samples.

FIG. 2B shows a sample of Old English and modern English type.

FIG. 3A shows a table stating information about the alphabet and letter groups.

FIG. 3B shows a table stating information about vowels and letter groups.

FIG. 3C shows an equation type paragraph identifying parts of the alphabet.

FIG. 3D shows a brief statement explaining the relationship of letters, sound and reading.

FIG. 3E shows a statement contrasting the number of letters with the learner's ability.

FIG. 4A shows a sentence in equation form describing the alphabet.

FIG. 4B shows two partial sentences showing vowels in uppercase and lowercase.

FIG. 4C shows a sentence identifying consonants, three lists of consonants and sample words.

FIG. 5 shows a list of letter blends and exceptions with sample words.

FIG. 6 shows a list of long vowels and sample words with macron markings.

FIG. 7 shows a list of short vowels and sample words with breve markings.

DETAILED DESCRIPTION OF THE INVENTION

Terminology

This invention is used with small groups of ten, although it can be used for fewer, even one. The persons benefitting directly from this invention have been referred to as "students." However, the term "student" conveys the mental image of a young person or young adult who is enrolled in classes. Because this invention is not limited to use by these traditional types, but is equally adapted to others who do not fit that image, the users of this invention will be called "participants." Group participants may be mature people who are clients engaged in psychotherapy or others who are non clients and also non students. They may be working adults, parents, grandparents or people who simply want to end their own frustration related to reading problems or the frustration of family members whom they suspect have reading problems but who are too intimidated to seek help for it outside their own homes. Participants may range in age from six years to ninety-six. Users of this invention find that reference to themselves as "participants" is more acceptable. It serves as a means of dissociating this process from the previously unsuccessful reading experiences when they were "students" in the traditional settings. So as not to breach the confidentiality of the psychotherapeutic process, the therapist, along with all others who use this invention for instructional purposes, is labeled "Instructor."

The above-mentioned elements and factors are described below as steps in the inventive process. There is overlapping and internging of the elements throughout the process although the goal of skill development remains constant. Most steps complement the preceding ones and continue functioning until the objective as demonstrated in writing and pronunciation is realized.

The first step in the method is the diagnostic testing. This identifies whether or not an existing reading problem is related to the participant's inability to read phonetically. It is done by testing the person's ability to spell nonsense words. The testing is conducted in private so as not to embarrass the participant and by that interfere with the person's ability to benefit from both the skill development and the repair processes. If the participant can correctly spell several nonsense words phonetically, the person may have other problems that this method does not address. However, if the participant fails to spell the word phonetically, he or she becomes a candidate for using this invention. Inability to pronounce or spell one phonetically designed nonsense word such as "loketumiba," which may take between one and five minutes, is sufficient to identify the problem. Another form of testing adapted to adolescents who refuse to admit having reading difficulties may be done by having them read unfamiliar text such as the business section of the newspaper. Difficulty pronouncing unfamiliar words demonstrates their need for help with reading skills.

The intent of steps two through six is to prepare the participant to learn by repairing some of the past damage to self esteem. The second step is accomplished through motivational address initially and throughout the process. Participants are commended for wanting to learn more about reading so that they will no longer need to depend on memorizing words. The instructor explains how problems with the popular methods of reading instruction lead to problems with reading. The objective is to help participants understand that for many people, reading problems are not internal but are external, and very likely originated with the method of instruction used to teach them to read. Adding to that dilemma, a couple of words are written on the board that demonstrate inherent problems in the language itself example: why is "sugar" not spelled "shugar"? This debunking of myths of personal deficiency frees participants from heavy psychological baggage.

The third element in the method consists of psychological safeguards, protection, for participants that have been built into the interactive activities. These safeguards are described early in the process to put participants at ease. This frees them to concentrate on the goal of skill development and allows the repair processes to operate. Participants are told:

A. Reasons participants have for joining the group are usually that they no longer want to depend on memorizing words in order to read B. Expectations, what is and is not expected of them as participants, are delineated as limits set on the instructor and the conduct of the session that serve to protect participants within the group and are listed as follows:
 1. all participation is voluntary
 2. participants will not be called on individually
 3. participants will not have to read aloud or explain anything read silently
 4. participants are encouraged to ask any and all questions C. Tolerance for elementary reviews pays off later in understanding the complete code The fourth step consists of an abbreviated historical review of the development of the English language with reference made to the dictionary for follow up study. The fact that English is said to be one of the more difficult languages to learn is noted. Examples of words that do not "follow the rules" are presented for illustration, such as "won" and "one."

The fifth step demonstrates the changes that the language has undergone since earlier times. Without warning, the instructor launches into a sampling of the Old English language by reciting a portion of a popular prose passage and concludes by asking if anyone understood it. Without fail, someone volunteers the comment that the instructor sounded as if speaking a foreign language. The explanation is then given that the passage was the spoken version of old English although it sounds very different from the English we are accustomed to hearing today. Then the modern English rendition of the same passage is provided and most recognize it immediately. Later their attention is directed to a sampling of Old English print that is written on page two of the materials as a reminder of this exercise. This exercise demonstrates again the existing myths and helps break the bond between the belief in personal defectiveness and the individual's reading problems.

The sixth step that motivates and repairs is the play activity which interests both young and old. It consists of the instructor's description of a group game, Broom Over, that asks the group to figure out how the person who calls out the correct answer to whose head the broom is over, can know the answer although that person is not in the room where the game is being played. Finally the explanation is given of the very simple to understand code that had been revealed to the person who was "it." The code is demonstrated for all to see. (The person in the center directs the point of the broom toward the targeted person in the circle but does so in a rather inconspicuous and nonchalant manner. The person who is "it" likewise observes the broom point in a non conspicuous manner before leaving the room, thereby empowering himself to give the correct answer.) The code for this play activity is so simple that all can learn it readily.

This activity proves the power of learning the code. That idea is explained and transferred to the obvious task at hand, that of learning the code needed for phonetic reading. Once again participants are reminded that the reading problem is not caused by personal internal defects, rather by not knowing the code. When this high level of motivation is reached, the participants are usually eager to accept the challenge to cooperate and direct their energy for learning by figuring out the reading code and winning. This time they will read! The sheer fun of the activity provides the energy needed to proceed with tackling the more technical aspects, the materials.

The introduction and use of materials especially designed to teach the phonetic code needed for reading while repairing psychological trauma caused by other methods of reading instruction is the seventh step and is described below, (see drawings). These materials are given to each participant. They are brief to avoid overwhelming participants.

Detailed Description of How the Written Materials are Used in This Inventive Method The written materials have been designed to accomplish several goals, which are to:

1. Provide appropriate visual clues that component phonics instruction
2. overcome the problems in most reading programs that confuse the learner
   a. with instruction that is illogically ordered, and
   b. that prompts the learner to depend on visual clues that are inconsistent with the task of learning listening skills, the backbone of phonics instruction
3. appeal to older learners without adding further emotional insult, and
4. be usefull in repairing some of the existing psychological damage resulting from the person's inability to read FIGS. 1a–d explain the three basic steps in reading which are: learning the sound of each letter, saying the sound out loud and placing emphasis on the correct syllable. FIGS. 2a and 2b provide a worksheet that allows space for writing words requested or words designed by the participant during the session. The paragraph over the worksheet area serves as a word bank to help participants in their search for words during the interactive word review processes. A sample of old English is written at the end of the paragraph of as a reminder of changes the language has undergone over time. Space is provided for writing in the time and date for the last session, if the time is divided for the benefit of younger children. FIGS. 3a–e describes the two categories of the alphabet, consonants and vowels, and challenges participants to learn the sounds of the letters in both categories.

Sheets one, two and three, that show FIGS. 1–3, of the written materials serve as quick reviews of the phonetic learning process involved in reading, information about the alphabet and the two divisions of the alphabet. These sheets are read aloud just as they are written, omitting the reference paragraph on page two. Participants are encouraged to ask questions about anything that could be a problem.

The word review interactive process begins on sheet four. FIGS. 4a–c show the vowels written separately from the consonants. Then the consonants are listed in order as they appear in the alphabet. Words are written next to each letter as examples of how the consonant is used in a word. The instructor says aloud the names of the letters that are vowels; these appear on one row near the top of the page. The consonants are addressed next. Each letter that is a consonant is identified and the name of the letter said aloud. Then the instructor spreads the sound assigned to the consonant followed by pronunciation of the word that contains that letter. For emphasis, the instructor pulsates the sound of the letter. Example: "B" is the letter, the sound is "ba," and "ba" is the sound heard when someone says the word "baby," or "ba-A-ba-E." Then the group as a whole is invited to offer words that contain the sound of "B" when the word is said out loud. The instructor repeats the words offered and write them on the board for all to see. This process continues through the letter "Z."

Calling for the words and writing them out is part of the self esteem repair process. Any word thought of by the instructor or suggested by a participant is used. The instructor an numerous opportunities to comment on how well the word offered fits the request, thus confirming the participant's ability to understand the request, follow instructions and give the correct answer. A little humor is introduced in this interactive process. When words are given that the instructor does not spell correctly or if a participant challenges the spelling of the word written on the board, the instructor will quickly consult the dictionary.

Opportunity is provided in this process for the instructor to explain the difference between phonetic reading and perfect spelling. Participants are encouraged not to waste time trying to spell perfectly by guessing at a word or lamenting the inability to spell it correctly. They are encouraged to use dictionaries and computer spell-check type programs instead. Reference is made to famous people who have had problems with spelling as ecidence that perfect spelling is no indicator of intelligence. This reassurance serves to reduce anxiety about spelling problems and frees participants to move on toward the goal of phonetic reading without belaboring their spelling faults. The goal is that they will be able to write words phonetically and speak the sounds of letters and syllables as they attempt to read unknown words.

Participants are reminded that they may elect to read silently form the reference paragraph on the worksheet, FIG. 2*a*, and from the other written learning materials, FIGS. 1–7, distributed in the session as a means of helping themselves to think of words during the word review exercise.

Because the interactive portion of the process extracts heavily from words offered by participants, the children and adults have opportunity for offering words commensurate with their own levels of language usage. Younger ones understand the words they give for inclusion in the exercise, i.e., "car"; older ones understand the words they offer i.e., "canopy." Often adolescents and adults intentionally offer multi syllabic and technical terms if they possibly can as an esteem bolstering exercise for themselves. Introducing such words definitely separates them from the little children and is a way used to describe to the instructor and other participants their intelligence and the reading level to which they aspire. That is acceptable, necessary and desirable as part of the self esteem repair process.

Once all of the consonants have been sounded and words supplied by participants during the word review exercise, the entire list of consonant letter sounds is reviewed. Participants are invited to ask questions. The attempt is made to proceed no faster than understanding occurs.

After the sounds of the consonants have been demonstrated, the process is repeated for the long and short vowels and the "Y" using the written materials on sheets six and seven, respectively.

Sheet six, FIG. 6, shows the vowels in large letters, listed in the order in which they appear in the alphabet with words following that are examples of how that vowel is used in a word when the vowel is long, or if the letter is "Y," which long letter sound it assumes and examples of words containing those sounds. The long vowel marks are placed over the separate vowels and over the vowels in words when the vowel is long.

Sheet seven, FIG. 7, also shows the vowels in large letters and occuring in the order in which they appear in the alphabet, with words following that are examples of how that vowel is used in a word when the vowel is short, or if the letter is "Y," which short letter sound it assumes and examples of words containing that sound. The older version of short vowel marks are placed over the separate vowels and over the vowels in words when the vowel is short.

For purposes of this invention, the vowel sounds are referred to as long and short. Participants are shown how to identify the line over the vowel as long vowel marking in the dictionary, and are taught to call all other sounds short. This provides ease of learning. Nevertheless, the various markings and indications for the short vowels, i.e., "⌢ ə", are written on the board for the group to see, Participants are told they may review the various markings markings by referring to their dictionaries. Rules associated with word development and pronunciation are included in the verbal instruction given during presentation of the written materials. Examples: "C" has no sound of its own, it borrows; "Q" is never written alone but always with a "U"; "when two vowels go walking, one usually does the talking . . . ," "I" before "E" except after "C," etc. This information is imparted throughout the word review exercises. Attention is drawn to sheet five, FIG. 5, where some exceptions to the rules are some letter combination sounds that may prove problematic, i.e., "er," "ir," and "ur," etc., and to special letter combinations, i.e., "Ch," "Th," etc. Additional special letter combinations and exceptions are written on this page as words are offered during these interactive exercises.

These condensed materials appear "easy" to use. One sees a few pages of information and says mentally, this is "simple." That is exactly the message needing to be conveyed to motivate and inspire the participant toward the task of overcoming past problems and actually relearning something that should always have been "simple." The brevity also induces parents to use the materials for helping their children.

A large part of the useless of the written materials in this invention is found in the logical order of presentation of the letters. Letters and their sounds are combined with word reviews and presented in two divisions or categories, vowels and consonants. Each category is explained then addressed completely in its turn. Vowels are identified first. Consonants are identified second. However, detailed instruction regarding actual letter sounds begins with consonants first because consonants represent the easier sounds to remember since most have only one sound. The long vowels are presented next and the short vowels last.

The letters of each category, are presented in their logical, orderly sequence, the order in which they appear in the alphabet. The sounds of the consonants are taught one after another beginning with "B" and proceeding through "Z." Likewise the vowels are presented in the order in which they fall, i.e., "A, E, I," etc. The participant can anticipate the flow of instruction and learn faster because the focus remains on the task of skill development rather than trying to figure the hidden or trick reason for letters appearing in random fashion rather than in order. Other methods that use an unpredictable mix of consonants and vowels seem to confuse the learner.

Using the two divisions and logical sequencing allows presentation of the most difficult portion of learning the phonetic code, the short vowels, to be placed last. The participant first becomes accustomed to success from having dealt with the easier letter sounds of consonants and long vowels. By the time short vowel sounds are introduced, the participant sees he is too close to finishing the task of learning the code to quit or believe that complete learning is impossible. He or she can do the last page!

The materials are designed to appeal to all age learners and not just to small children. These materials show subtle recognition of the older person's ability to appreciate concepts that are abstract and not limited to concrete representations as may best appeal to children. There are no pictures. The primary goal is learning the phonetic code; that depends on hearing. Without pictures that could prompt participants to guess at words, the letters themselves must provide the only hint of how the words should be pronounced. Likewise, the sounds made when the letters in the word are spoken are the only hint participants in this method will have when they want to spell a word that they hear. The emphasis is on listening and training the ear to hear sounds. The participant is shown by demonstration how to say sounds in words slowly enough to link them to the specific sounds of the letters, both vowels and consonants. This allows participants to make the connection between the fact that since they began talking as babies, they have been speaking the sounds of letters. Those sounds together make words. As simple as this fact is, it is not always appreciated until attention is drawn to it during this process.

These materials without pictures represent additional safeguards that prevent psychological stress on the user. The words chosen show appreciation for the older participant whose capabilities exceed those of children six years of age who are just learning to read. Example: other books or tapes may use the word "Elephant" to explain pronunciation of the letter "E." The text very likely includes a picture of the elephant. To provide repair, the materials of this invention avoid the practice of coupling pictures with the words. To do so might be construed as demeaning the intelligence of the older child and adult who conceptually know very well what an elephant looks like and do not need a picture to enhance their understanding of the word. To use the picture, and to put that picture in color, a practice especially targeted toward young children, would be synonymous with placing that learner on the level of the little child. The learner would believe that the instructor of this method and other participants also see him as a child because of his past failure to learn the basic skill taught to little children. Elements of embarrassment would surface and interfere with the person's learning experience, most likely resulting in turning the entire focus of the learning experience into efforts to regain lost dignity. The frustration of older children and adolescents would express itself in disruptive behavior and the learning process would be abandoned. Again, the task of learning the reading code would not be accomplished. Therefore, whatever might be perceived as putting users of this invention on the child's level is avoided.

Additional psychological safeguards occur in the actual selection of words used in the letter sound demonstrations. Some words selected for these materials rely heavily on conceptual capability of the participant rather than on visual perception. An example would be use of the word "Utter" rather than "Umbrella." "Utter" is an adjective and adverb usually, although it can be a verb. Conceptually, it cannot be pictured mentally nearly as easily as can "Umbrella," a noun. The mental challenge of understanding the word "utter" increases when compared to understanding the word "Umbrella." The adult user of this invention probably knows the word "Utter." The use of words unfamiliar to children tells the adult that this invention is specifically designed for someone other than children. As with the word review exercises, the adult learner can relax and feel validated that he has not been cast in the mold of the "child" or the "ignorant." Ironically, children adapt to the words selected and are not hindered since they can add their favorite words, such as "cat," "elephant," etc., during the interactive word review portions of the method.

A review of the long and short sounds of the vowels finishes the specific use of the written materials. Instructions are given that materials are to be kept in clear view and used for reference throughout the remaining activities of the process.

The eighth step is the application of the learning that has taken place. The instructor demonstrates with nonsense words how one can spell and write words simply by listening to the sounds and writing the letters that the sound represents. The interactive process is again used and participants are given the opportunity to ask the instructor to spell any word phonetically, whether real or nonsense. Then the opportunity is reversed and participants are asked to write on their worksheets nonsense words given by the instructor. Opportunity is then provided for anyone wanting to do so to share his or her spelling. Anytime participants are too shy to volunteer, the instructor proceeds by sounding the word slowly and writing the corresponding letters. A few brave participants, young and old, will usually volunteer to write on the board. This process trains the ear to hear letter sounds and not just whole words. Also, it begins to place participants in the instructor role, a practice especially significant for parents.

The ninth step is a focus on correction of old habits associated with previous reading instructional methods that were based on memorizing words. Throughout the interactive process described above, the instructor takes every opportunity to explain the difference between phonetic spelling and trying to force whole words that are known into the spelling of unknown words. Repeatedly the focus must be brought back to the participant's writing only what he or she hears. Once this idea is grasped, participants begin to better understand the problems they experienced with trying to memorize words and how that differs from remembering and writing letter sounds. Examples are given of how to merge sounds to make syllables, i.e. "UN"- "DER".

In the tenth step, the last exercise tests the participant's ability to hear, speak and write correctly the sounds of consonants and long and short vowels as they occur in real words. This final test of abilities comes with the challenge for participants to write out phonetically the longest and hardest word that the instructor can randomly select from the dictionary. Reversing that exercise, participants are asked to pronounce the hardest and longest word from the dictionary for the instructor or other participants to write. Often the enthusiasm is so great that the role of instructor is assumed by participants as they become fully engaged in exchanging words between themselves for writing and pronunciation.

When participants successfully complete the final test, they are awarded certificates of competence indicating they have learned the code for phonetic reading.

I claim that this invention:

1. A method for teaching the phonetic code by training the ear to hear letter sounds in spoken words which consists of an instructor:

A. providing a set of written materials and an erasable board;

B. reading to a student from the written materials, 1. a statement of three steps that occur in reading, which steps are:
   a. learning the sounds assigned to each letter,
   b. saying those sounds out loud, one after the other,
   c. placing emphasis on the correct syllable as shown by a dictionary mark,
2. statements that direct the reader to use a reference paragraph for extracting samples of words, and describe the number of letters in the alphabet, two major divisions of the alphabet, and two groups of vowels;

C. stating that a macron denotes pronunciation of a vowel as long, and a breve denotes pronunciation of a vowel as short;

D. saying the name of a letter, which letter is selected in alphabetical order from alphabetically arranged groups of letters wherein a first group comprises consonants, a second group comprises long vowels, and a third group comprises short vowels, and wherein all consonants are selected and written before long vowels are selected and written, and all long vowels are selected and written before short vowels are selected and written;

E. audibly making the sound given to the letter spoken in step D, and stating that said sound is the sound given to said letter;

F. for each sound given to the letter noted in Step E, writing a word containing that sound;

G. pronouncing the word that has been written in Step F;

H. directing the student to say audibly each sound of the letter designated in Step E with the instructor who repeats each sound of said letter a plurality of times;

I. saying the word written in Step F audibly, using a method of providing the word selected from the following:
   1. asking the student to provide a word,
   2. asking the student to look at words on the written materials that serve to remind the student of words that can be offered, and
   3. the instructor's memory;

J. writing the word provided in Step I on the erasable board;

K. stating rules of word development and pronunciation;

L. reading a list of special letter combinations from the written materials and writing on the written materials, additional special letter combinations taken from words offered;

M. repeating steps D through J until the letters and letter sounds in the groups of consonants, long vowels, and short vowels, have been studied in their alphabetical order;

N. directing the student to observe all that is written on the erasable board;

O. directing the student to keep the written materials in view at all times;

P. testing the student's ability to hear sounds of letters in words and correctly associate the letter sounds with the proper letters in words by:
   1. audibly pronouncing a test word which is a non-real, made-up word called a nonsense word,
   2. directing the student to listen to the sounds heard in said test word of step 1 and write such word on the worksheet of the written materials,
   3. asking the student to tell the instructor the letters and arrangement of letters used in spell the said test word,
   4. verbally correcting the student's written word by telling the student of any errors being made, said errors selected from among the group of:
      a. writing letters that are not heard,
      b. not writing letters that are heard,
      c. forcing whole words that have been learned into the spelling of test word;
   5. audibly pronouncing said test word and writing letters that correspond to the sounds of said word,
   6. directing the student to write another test word, and
   7. repeating the steps 1 through 5,
   8. directing the student to listen to pronunciation of a real multi syllabic word selected randomly from a dictionary and pronounced by the instructor and write the letters that correspond to the sounds of said word, and,
   9. repeating step 4,
   10. directing the student to randomly select a multi syllabic word from the dictionary and pronounce said word such that, by listening, letters that correspond to the sounds of the letters of the pronounced said word, can be written correctly, and,
   11. repeating step 4.

2. The method of claim 1 in which three groups of letters, which groups are consonants, long vowels, and short vowels, that are arranged in alphabetical order and written in separate visual fields on the written materials, are taught in alphabetical order, beginning with consonants first, long vowels second, and short vowels third.

3. The method of claim 1 wherein the written materials consist of: seven or less sheets of paper imprinted with letters, words, three phonetic markings, a macron, a breve, and a stress mark, and statements about reading that are arranged in paragraph, equation and list formats which state that the reader is smart and can learn, that state three steps in reading, two divisions of the alphabet, two groupings of vowels, the number of letters in the alphabet, the number of letters that are consonants, and the number of letters that are vowels, and that show four groupings of letters, which groupings are consonants, long vowels, short vowels, and special letter combinations, with the four groups of letters arranged on different pages and shown with examples of words written adjacent each letter and each special letter combination that embodies the sound of said letter and said letter combinations, and showing three of the four letter groupings, the consonants, long vowels and short vowels, arranged alphabetically.

4. The method of claim 3, wherein three groups of letters are illustrated on the written materials, which groups are consonants, long vowels, and short vowels, with each group arranged in alphabetical order, and the separate groups placed on different pages in the arrangement of the pages of the written materials, wherein the consonants are shown before the long vowels and the long vowels are shown before the short vowels.

5. The method of instruction of claim 1 further comprising the steps of:
   A. telling the student that all student participation during the instruction phase must be voluntary and that students will not have to read aloud;
   B. illustrating by writing on the erasable board, words that demonstrate problems in the language, wherein the spelling of the word differs from pronunciation of the word;
   C. telling the student historical facts about development of the English language;
   D. telling the student historical facts about the varying methods used for teaching reading;

E. telling the student that correct spelling ability is not evidence of superior intelligence and that phonetic spelling is valuable;
F. demonstrating changes that have occurred in the English language by reciting a portion of verse in Old English, pausing while telling the student he or she may state what the student thinks was spoken, and repeating the verse in modern English;
G. demonstrating a code dependent game, that shows the student how knowing the code allows players to give correct answers, and stating that normal people have the ability to learn a code associated with reading that can enable them to read;
H. reading statements from the written materials that tell students they are smart and can learn to read;
I. telling the student throughout the instruction and testing that he or she is doing well in responding to questions, and stating how well the student performed by naming the letters that have been written correctly during the testing.

6. The method of claim 3 wherein the written materials further comprise:
A. sentences that state that the reader is smart and can learn;
B. a sentence identifying the English language as problematic;
C. a sentence written in Old English type that serves to remind the student of changes that have occurred in the language.

* * * * *